United States Patent [19]
Perry, Jr.

[11] 3,845,664
[45] Nov. 5, 1974

[54] PRESSURE TRANSDUCER
[76] Inventor: Joseph A. Perry, Jr., 1815 Eleanor Ave., Saint Paul, Minn. 55116
[22] Filed: Dec. 26, 1972
[21] Appl. No.: 318,249

[52] U.S. Cl.............................. 73/406, 73/388 BN
[51] Int. Cl. ............................................. G01l 7/08
[58] Field of Search .............. 73/388 BN, 406, 407; 137/85

[56] References Cited
UNITED STATES PATENTS

| | | | |
|---|---|---|---|
| 2,712,321 | 7/1955 | Grogan | 92/49 |
| 2,883,995 | 4/1959 | Bialous et al. | 92/49 |
| 3,482,449 | 12/1969 | Werner | 73/406 |
| 3,581,572 | 6/1971 | Frick | 73/395 |
| 3,661,164 | 5/1972 | Kreuter et al. | 137/85 |

Primary Examiner—Donald O. Woodiel
Attorney, Agent, or Firm—James C. Nemmers; Haven E. Simmons

[57] ABSTRACT

A device for measuring the pressure of a fluid so as to provide a reading at a location remote from the device. The device utilizes a dual-diaphragm arrangement with a force button positioned between the diaphragms thereby providing two surfaces each of a predetermined area, against one of which the pressure to be measured is exerted. A controlled and measured fluid pressure is applied to the effective area of the other diaphragm surface until a state of equilibrium is reached at which time the applied force will equal the force exerted by the pressure to be measured. By varying the effective surface areas of the diaphragm the ratio of the applied pressure to the pressure that is to be measured can also be varied as desired.

3 Claims, 5 Drawing Figures

PRESSURE TRANSDUCER

BACKGROUND OF THE INVENTION

The prior art discloses many and various types of devices for measuring the pressure of a fluid in a tank or flowing through a pipe line. Such devices have many uses, such as simply indicating the pressure of the fluid or the liquid contents of a vessel. However, they also can be used in a variety of systems to control processing functions such as the amount of product added to or taken out of a storage tank. When such devices are used for measuring fluids which are food products, pharmaceuticals or certain critical industrial chemicals, the device must not only serve the function of measuring the pressure, but it must also be designed to meet the requirements of a sanitary design. In other words, the device must be physically free from and mounted so as to eliminate pockets, crevices, etc. which are not readily and easily cleanable.

Many such devices use mechanical links, levers, springs or pivots and thus become quite complex and thus costly. Other devices, such as that shown in my prior U.S. Pat. No. 3,161,051 issued Dec. 15, 1964, and entitled "Level Indicating Device and System", utilize an applied fluid pressure on one side of a diaphragm-nozzle arrangement that will give an accurate indication of the fluid pressure to be measured at such time as an equilibrium between the pressures is established. In such devices, however, the applied fluid pressure must equal the fluid pressure to be measured. That is, such devices have a fixed pressure ratio, usually a one-to-one ratio, and thus require custom designed read-out devices for each specific application. It is an object of my invention to provide an improved pressure transducer of a sanitary design which can be easily modified to vary the pressure ratio between the applied pressure and the pressure to be measured.

SUMMARY OF THE INVENTION

The pressure transducer of the invention has a basic body unit that holds a pair of spaced-apart diaphragms between which there is positioned a force button. The outside surface of one diaphragm is exposed to the fluid pressure to be measured and the outside surface of the other diaphragm is exposed to the applied fluid pressure which is controlled and measured. The force button provides a predetermined surface area against which there is applied the pressure of the fluid to be measured. Similarly, the force button provides a predetermined surface area supporting the other diaphragm and against which the applied fluid pressure is exerted. When the force applied to one diaphragm is equal to the force exerted on the other diaphragm by the fluid that is being measured, an equilibrium will be established at which time the pressure of the applied fluid is measured giving an accurate indication of the pressure of the other fluid. The size of the effective force areas provided by the force button can be varied depending upon the specific application. This allows a single basic unit to be adapted for any desired ratio of the applied pressure and pressure being measured. Thus, standard read-out devices can be used in almost any application regardless of the pressure range being measured. The unit also provides a unique way of securing the diaphragms in place and of sealing them so that the unit can be used in sanitary applications.

DESCRIPTION OF THE PREFERRED EMBODIMENT OF THE INVENTION

Figure 1:
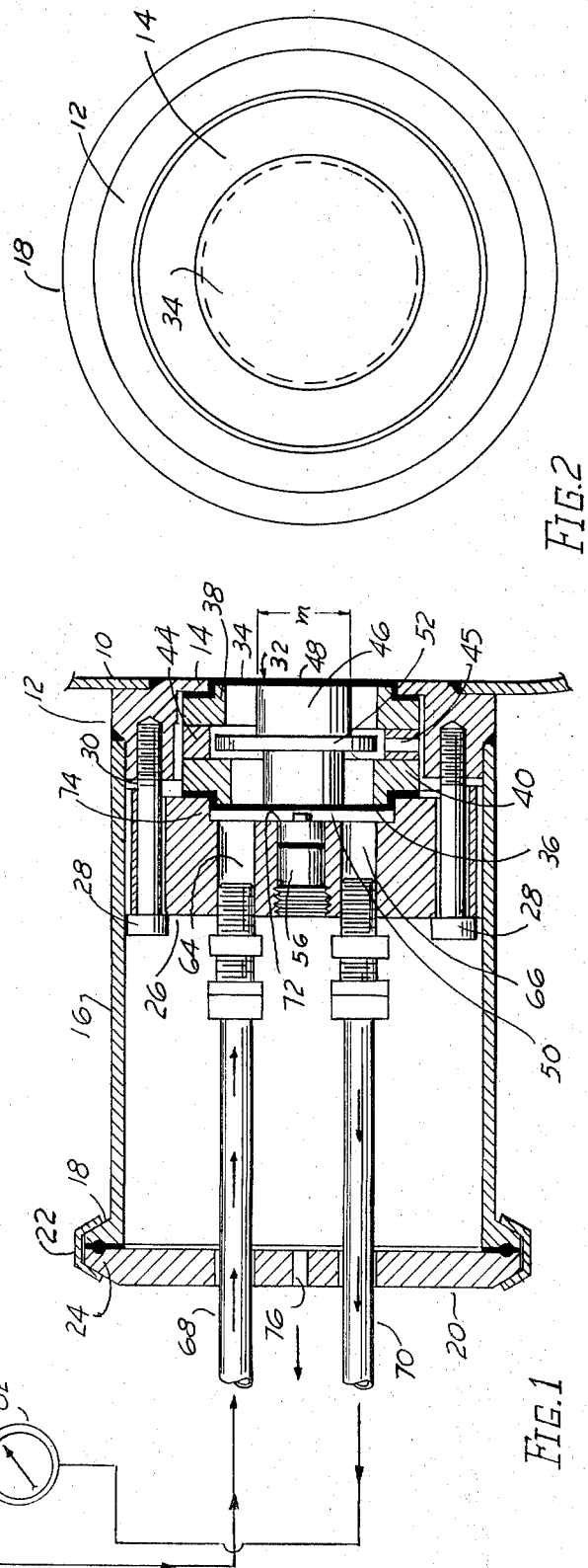
FIG. 1 is a longitudinally taken sectional view of a pressure transducer unit constructed according to the principles of the invention and showing the unit permanently attached to the wall of a tank.

FIG. 1 of the drawings illustrates a preferred embodiment of a pressure transducer unit suitable for use in applications where sanitary standards must be met. The unit shown is designed to be mounted in the wall 10 of a tank or other fluid storage vessel. The unit is thus provided with an annular mounting member 12 which is welded or otherwise suitably secured in a circular opening within the wall 10. The mounting member 12 has an inwardly extending flange 14, the exterior surface of which is substantially flush with the interior surface of the tank wall 10. A hollow cylindrical shell 16 has one end suitably secured to the mounting member 12. For example, shell 16 may be threaded onto the mounting member 12 or may be welded so as to be permanently fixed to it. The outer end of shell 16 is provided with an annular flange 18 against which there is engaged an end cap 20 that is removably secured to the shell 16 by means of a suitable clamp 22. If desired, a seal 24 can be provided between the end member 20 and flange 18 of the shell 16.

Figure 4:
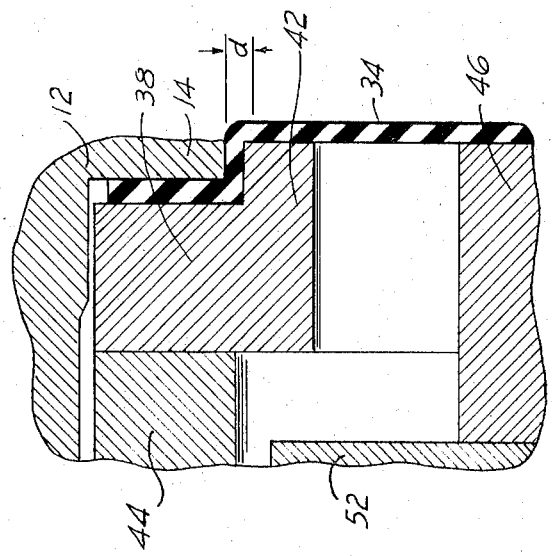
FIG. 4 is an enlarged sectional view of a portion of the transducer of FIG. 1 and illustrating the method of securing and sealing the diaphragms in place.

A cylindrical shaped body member 26 is positioned inside the cylindrical shell 16 near the mounting member 12. Suitable threaded fasteners 28 hold members 12 and 26 in a fixed relative position with their adjacent surfaces spaced apart thus forming a space 30 between them. Inside the annular mounting member 12 there is positioned a pressure range capsule which is indicated generally by the reference numeral 32. Included in the capsule 32 are a pair of thin flexible diaphragms 34 and 36, which are stretched over annular shaped diaphragm retaining rings 38 and 40, respectively. The cross sectional shape of each of the diaphragm retaining rings 38 and 40 is somewhat L-shaped as shown, and the exterior configuration of ring 38 corresponds to the interior configuration of the mounting member 12. As best seen in FIG. 4, diaphragm retaining ring 38 is provided with an annular flange 42, the diameter of which is slightly less than the interior diameter of the flange 14 of mounting member 12. This difference in diameter is designated "$d$", as indicated in FIG. 4. The dimension $d$ is less than the thickness of diaphragm 34 so that as the capsule 32 is inserted in place in the transducer unit, the diaphragm 34 will be squeezed between the retaining ring 38 and flange 14 of the mounting member 12. This also serves to stretch the diaphragm 34 over the retaining ring 38 thus eliminating wrinkling and buckling of the diaphragm. This constructin not only results in a tightly held diaphragm but also provides a fluid tight seal that is free from crevices, and thus meets all sanitary design requirements.

Between the two retaining rings 38 and 40 is a spacer ring 44. A radially extending passageway 45 in ring 44 provides a vent from the interior of capsule 32 and also serves as a leak detector should either the diaphragm 34 or diaphragm 36 fail to provide a fluid tight seal in the unit. Since passageway 45 maintains the pressure between the diaphragms 34 and 36 at something less than the value of either the applied pressure or the pressure of the fluid to be measured, it serves as a safety vent to prevent either the applied fluid or the fluid to be measured from entering and mixing with the other. The interior diameter of spacer ring 44 is preferably less than the interior diameter of either of the retaining rings 38 or 40. The purpose of this will become evident from the description hereinafter of the force button 46 and its action in response to the pressures applied to it. The force button 46 may be made up of several parts or it may be formed from a single piece of material. In either event, the surface of force button 46 that is engaged with diaphragm 34 provides a force area 48 having a diameter "m" as indicated in FIG. 1. The opposite end of force button 46 that is engaged with diaphragm 36 provides a force area 50. The surfaces of force button 46 are preferably secured to the diahragms 34 and 36 by a suitable adhesive. Near the center of force button 46 there is provided a safety ring 52, the outer diameter of which is greater than the inner diameter of either of the retaining rings 38 or 40 but less than the inner diameter of the spacer ring 44. Thus, excessive movement of the force button 46 (either to the right or left of FIG. 1) is limited by engagement of safety ring 52 with the retaining ring 38 or retaining ring 40 respectively. Safety ring 52 thus prevents excessive pressure on the force button 46 from damaging the unit or from forcing the button 46 through diahragm 34 into the interior of the fluid storage vessel.

If desired, the capsule 32 may be preassembled as a unit that is designed for a particular application. In such a case, the various components of the capsule 32 would preferably be affixed together and assembled or removed from the transducer as a single unit. As will become evident from the description hereinafter, by changing the design of the capsule 32 the pressure transducer can be used in a variety of different applications.

Figure 2:
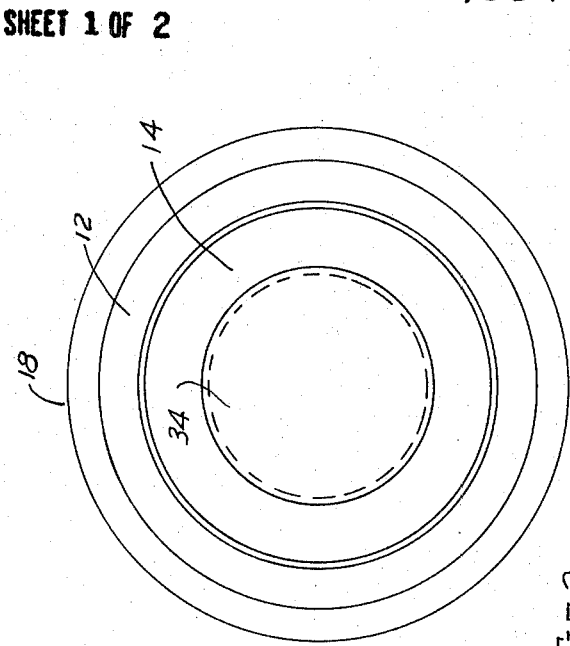
FIG. 2 is an end view of the transducer of FIG. 1.
Figure 3:
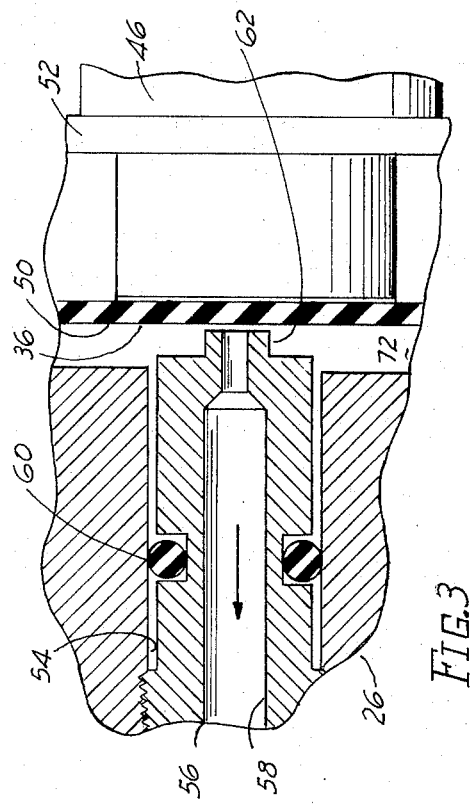
FIG. 3 is an enlarged sectional view of a portion of the transducer of FIG. 1 and showing the nozzle-diaphragm arrangement.

The body member 26 that is positioned inside of shell 16 is provided with an axially extending opening 54 (FIG. 3) through its center into which there is received a nozzle 56. O-ring seal 60 provides a fluid tight seal between nozzle 56 and opening 54. Nozzle 56 is provided with a central opening 58, and as best seen in FIG. 3, a projection 62 on the end of nozzle 56 is positioned closely adjacent to the diaphragm 36. Nozzle 56 preferably is threaded into opening 54 so that its position relative to capsule 32 can be varied. The body member 26 is also provided with two additional axially extending openings 64 and 66 which extend parallel to opening 54 but are radially spaced therefrom. A fluid inlet tube 68 has one end threadedly seated in opening 64 while fluid outlet tube 70 has one end seated in opening 66. Body member 26 is provided with a central recess 72 that communicates with inlet opening 64 and outlet opening 66. Recess 72 forms a shoulder 74 on body member 26. Shoulder 74 engages diaphragm 36 and compresses it against retaining ring 40 thus squeezing it and holding it in place in a manner similar to that of diaphragm 34.

With the arrangement thus described, a fluid flow path is provided from inlet tube 68 into the recess 72. If projection 62 is firmly seated and sealed against diaphragm 36, no fluid will pass through opening 58 in nozzle 56 and a static pressure will exist in outlet tube 70 which pressure will be equal to the applied pressure. As long as sufficient fluid pressure within the storage vessel is exerted against diaphragm 34 to maintain diaphragm 36 against nozzle 56, the applied pressure in recess 72 will increase. When the applied fluid pressure in recess 72 that is exerted against diaphragm 36 is sufficient to move force button 46 to the right (FIG. 1), the fluid will be exhausted through the passageway 58 in nozzle 56 and then to the atmosphere through opening 76 in the end cap 20. When this occurs, an equilibrium will be established, and if the effective force area 48 provided by force button 46 and diaphragm 34 is the same as the effective force area 50 provided by diaphragm 36, then the pressure in recess 72 will equal the pressure of the fluid in the storage vessel that is being measured. However, it is often desirable to have a ratio of pressures other than one-to-one between the applied pressure and the pressure of the fluid to be measured. With the arrangement illustrated in FIG. 1, the ratio is other than one-to-one since the effective force area 48 is greater than the effective force area 50. By varying the ratio of these two areas, the ratio of the applied pressure to the pressure of the fluid to be measured can be proportionately varied.

As is known to those skilled in the art, the air or other fluid that is introduced into the system is supplied from a source of fluid under pressure (not shown) through a differential pressure regulator 78 of any suitable design. The pressurized fluid is then passed through a restrictor 80 which can be a simple orifice. This provides a constant flow fluid supply and minimizes unnecessary and undesirable motion or movement of the capsule 46. The applied fluid pressure is measured by a pressure indicator 82 located in the outlet line connected to output tube 70. Indicator 82 may be a pressure gauge, manometer or electrical pressure transducer with a digital indicator. Obviously, pressure indicator 82 can be remotely located from the pressure transducer unit of the invention, and other devices (not shown) such as pressure actuated switches, etc., can also be connected to the outlet line 70 to control any desired functions. Since the force button 46 can be designed to produce almost any desired ratio of the applied pressure to the pressure to be measured, the readout devices, such as pressure indicator 82, can be standard, readily available items rather than custom-made items. This selectivity of ratio is accomplished without levers, springs, or other mechanical devices which add to the cost and decrease the accuracy of the system.

Figure 5:
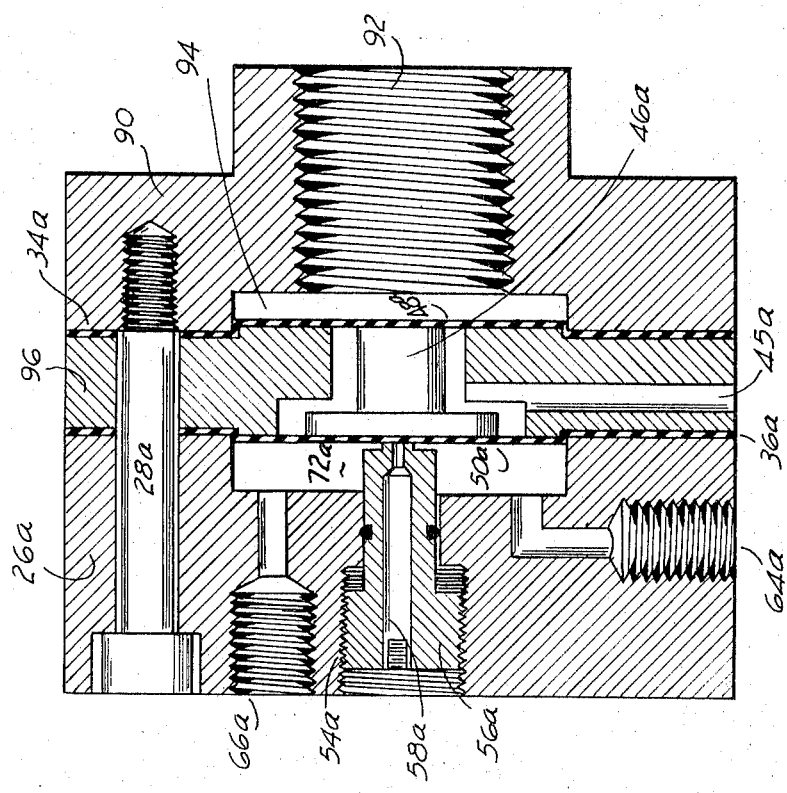
FIG. 5 is a sectional view of another embodiment of the invention.

In FIG. 5, there is shown a modified version of the transducer of the transducer of FIG. 1. The embodiment of FIG. 5 is a general industrial design for use in applications other than those where sanitary requirements apply. In this embodiment, parts corresponding to those of the embodiment shown in FIG. 1 will be referred to by the same reference numeral followed by the letter "a". The pressure transducer of FIG. 5 has a first body member 26a that is secured to a second body member 90 by means of threaded fasteners 28a. It should be understood that there are preferably six such fasteners spaced at 60° intervals, but that in the sectional view of FIG. 5 only one such fastener is shown. The second body member 90 has a threaded opening 92 to provide for connection to the source of fluid to be measured. The inner end of the second body member 90 has a central recess 94 adjacent to a diaphragm 34a which is squeezed between member 90 and the retaining ring 96. A second diaphragm 36a is squeezed between the opposite face of retaining ring 96 and the first body member 26a. The unit is held in assembled condition by means of the fasteners 28a.

The first body member 26a is provided with an inlet passageway 64a that is preferably threaded for connection to a source of controlled air or other fluid pressure. The first member 26a is also provided with an outlet passageway 66a.

The first body member 26a is also provided with a central passageway 54a in which there is threadedly received a nozzle 56a having a central passageway 58a. The first body member 26a is also provided with a central recess 72a adjacent the diaphragm 36a. Passageway 64a and the outlet passageway 66a both communicate with the annular area formed by recess 72a around the end of nozzle 56a. As shown in FIG. 5, the inner end of nozzle 56a is positioned closely adjacent to diaphragm 36a. Positioned between the diaphragms 34a and 36a is a force button assembly 46a. Force button 46a provides an effective force area 48a for diaphragm 34a and an effective force area 50a for diaphragm 36a. Preferably, a vent passageway 45a is provided in the retaining ring 96 which functions similar to the passageway 45 of the first embodiment.

The pressure transducer of the embodiment of FIG. 5 operates the same as the unit of the first embodiment. In other words, it is connected to a source of air or other fluid pressure that is applied to diaphragm 36a through inlet passageway 64a. As long as the applied pressure is less than the pressure of the fluid to be measured which is applied to diaphragm 34a through inlet 92 (assuming the pressure ratio to be one-to-one), the passageway 58a of nozzle 56a will be sealed off by engagement of the end of the nozzle 56a *with diaphragm 36a.* Since the fluid flow is restricted, the applied pressure will continue to increase until the force of the applied pressure against force button 46a moves the diaphragm 36a away from the end of nozzle 56a. At this time, the applied pressurized fluid will be exhausted through passageway 58a in the nozzle 56a and in a very short time an equilibrium will be reached at which time the applied pressure will be equal to the pressure to be measured (assuming the pressure ratio to be one-to-one). As in the first embodiment, the ratio of the applied pressure to the pressure to be measured can be varied depending on the design of the force button 46a. By changing the area of the force button presented to each of the diaphragms 34a and 36a the desired ratio can be achieved.

With either the embodiment of FIG. 1 or that of FIG. 5, the transducer unit can be used to measure temperature, converting the temperature indication into a useable signal. Since in a constant volume, gas-filled system the absolute pressure varies directly as the absolute temperature a temperature sensing bulb can be filled with air or other gas. Thus, by measuring the gas pressure in the closed system using the transducer unit of the invention, the pressure can be converted into a temperature indication at a location remote from the pressure transducer.

It will be further obvious to those skilled in the art that the pressure transducer of the invention can be used to measure either temperature or pressure of a fluid in a pipe line as well as fluid contained in a tank or other storage vessel. Also, the transducer mounting arrangements can be adapted for any particular application. The transducer can be used in applications for measuring all types of fluids including toxic, corrosive and hazardous fluids. Since the only moving part of the transducer is the force capsule, it is obviously extremely simple and produces a high degree of accuracy. The unit can be used in either high or low temperature applications, the only limitation being the availability of suitable materials for the diaphragm which comes in contact with the fluid to be measured. There are many other modifications and variations which can be made by those skilled in the art to the preferred embodiments disclosed herein without departing from the spirit and scope of the invention. It is my intention, however, that all such revisions and modifications as are obvious to those skilled in the art will be included within the scope of the following claims.

I claim:

1. A pressure transducer for measuring the pressure of a fluid product confined in a receptacle such as a tank, pipe, or the like, said transducer comprising a mounting member for affixing the transducer to said receptacle, said member having a circular opening therein to provide for contact between the product in said receptacle and the transducer, a main body member removably affixed to said mounting member and defining a space therebetween, a pressure range capsule positioned in said space and removably held in place when said main body member is affixed to said mounting member, said capsule being replaceable by first removing said main body member from said mounting member, said capsule including a first thin, flexible and stretchable diaphragm having a first side exposed to said fluid product and against which first side the pressure of said fluid product is exerted, said capsule having a first annular projection thereon defining an opening over which said first diaphragm is stretched, the difference between the diameter of the circular opening in said mounting member and the outer diameter of said annular projection being less than the thickness of said first diaphragm, the said capsule also including a second thin, flexible and stretchable diaphragm spaced from said first diaphragm and having a first side facing the direction opposite and away from the first side of said first diaphragm, said capsule having a second annular projection defining an opening over which said second diaphragm is stretched, a force button positioned between the first and second diaphragms and having a first force area engaged with said first diaphragm and a second force area engaged with said second diaphragm, said first and second force areas of said force button being less than the areas of the respective openings over which said first and second diaphragms are stretched, said force button cooperating with said diaphragms to provide effective areas against which fluid forces can act which effective areas are determined by the size of the force areas of said force button, said second diaphragm sealingly engaging said main body member to define an enclosed space with the first side of said second diaphragm defining a portion of said space, a nozzle in said main body member having an exhaust passageway communicating with said enclosed space with one end of said exhaust passageway terminating in said enclosed space adjacent the first side of said second diaphragm, inlet means extending through said main body member and communicating with said enclosed space for supplying an applied fluid under controlled pressure against the first side of said second diaphragm, outlet means extending through said main body member and communicating with said enclosed space for exhausting the applied fluid from said enclosed space, said second diaphragm being intermittently engageable with said nozzle to close off the exhaust passageway of said nozzle whenever said second diaphragm is in engagement with said nozzle, and said capsule being replaceable in said transducer by removing said main body member from said mounting member.

2. The pressure transducer of claim 1 in which said first and second force areas of said force button are different in size.

3. The pressure transducer of claim 1 in which said capsule includes stop means to limit movement of said force button against said first diaphragm when the force exerted against the second diaphragm by the applied fluid exceeds the force exerted against said first diaphragm by said fluid product, said stop means comprising an annular recess in the center of said capsule around said force button, and a portion of said force button extends into said recess.

* * * * *